United States Patent
Kavantzas et al.

(10) Patent No.: US 8,966,572 B2
(45) Date of Patent: Feb. 24, 2015

(54) DYNAMIC IDENTITY CONTEXT PROPAGATION

(75) Inventors: Nickolas Kavantzas, Emerald Hills, CA (US); Jiandong Guo, Palo Alto, CA (US); Pratibha Gupta, Cupertino, CA (US)

(73) Assignee: Oracle International Corporation, Redwood Shores, CA (US)

( * ) Notice: Subject to any disclaimer, the term of this patent is extended or adjusted under 35 U.S.C. 154(b) by 215 days.

(21) Appl. No.: 13/486,848

(22) Filed: Jun. 1, 2012

(65) Prior Publication Data

US 2013/0086629 A1   Apr. 4, 2013

Related U.S. Application Data

(60) Provisional application No. 61/541,442, filed on Sep. 30, 2011.

(51) Int. Cl.
| | |
|---|---|
| *H04L 29/06* | (2006.01) |
| *G06F 21/33* | (2013.01) |
| *G06F 17/00* | (2006.01) |
| *G06F 7/04* | (2006.01) |
| *G06F 15/16* | (2006.01) |
| *G06F 17/30* | (2006.01) |

(52) U.S. Cl.
CPC ...................................... *G06F 21/33* (2013.01)
USPC ............. 726/1; 726/6; 726/8; 726/9; 713/156

(58) Field of Classification Search
None
See application file for complete search history.

(56) References Cited

U.S. PATENT DOCUMENTS

| | | |
|---|---|---|
| 6,516,416 B2 | 2/2003 | Gregg et al. |
| 7,290,288 B2 | 10/2007 | Gregg et al. |
| 7,367,044 B2 | 4/2008 | Fowler et al. |
| 8,190,593 B1 | 5/2012 | Dean |
| 8,359,396 B2 | 1/2013 | Chan et al. |
| 8,397,302 B2 | 3/2013 | Mont et al. |
| 8,458,781 B2 * | 6/2013 | Radhakrishnan ................ 726/9 |
| 8,468,578 B1 | 6/2013 | Lu et al. |
| 2002/0078365 A1 | 6/2002 | Burnett et al. |

(Continued)

OTHER PUBLICATIONS

Non-Final Office Action for U.S. Appl. No. 13/486,907 (Oct. 25, 2013) 16 pages.

(Continued)

*Primary Examiner* — Shin-Hon Chen
(74) *Attorney, Agent, or Firm* — Kilpatrick Townsend & Stockton LLP (57) ABSTRACT

Techniques are provided for dynamically propagating identity context for a user in a Service-Oriented Architecture. Methods and apparatus are provided that include receiving a request to invoke a web service, retrieving first security claims from application identity context information pertaining to a user, generating second security claims at runtime, packaging the first and second security claims into an authentication token, and transmitting the authentication token to a second computer system in a service request. The second computer system can be configured to extract the first and second security claims from the authentication token, validate the extracted first and second security claims, generate identity context information based upon the extracted first and second security claims, and publish and propagate the identity content information in an identity context object. The second computer system can verify that the security claims conform to corresponding security claim schemas stored in a claims dictionary.

27 Claims, 6 Drawing Sheets

(56) References Cited

U.S. PATENT DOCUMENTS

| | | |
|---|---|---|
| 2003/0133554 A1 | 7/2003 | Nykanen et al. |
| 2003/0177388 A1* | 9/2003 | Botz et al. ............. 713/201 |
| 2006/0116105 A1 | 6/2006 | Frankel et al. |
| 2006/0206932 A1 | 9/2006 | Chong |
| 2007/0255841 A1* | 11/2007 | Chong ............. 709/229 |
| 2008/0109884 A1 | 5/2008 | Kulkarni et al. |
| 2009/0210499 A1 | 8/2009 | Upadhyayula et al. |
| 2010/0115577 A1 | 5/2010 | Ratnala et al. |
| 2010/0154041 A1* | 6/2010 | Dalzell et al. ............. 726/6 |
| 2010/0318604 A1 | 12/2010 | Stafie et al. |
| 2011/0004753 A1* | 1/2011 | Gomi et al. ............. 713/156 |
| 2011/0035794 A1* | 2/2011 | Wang et al. ............. 726/9 |
| 2011/0202988 A1* | 8/2011 | Otranen et al. ............. 726/8 |
| 2012/0060210 A1 | 3/2012 | Baker et al. |
| 2013/0047240 A1* | 2/2013 | Radhakrishnan ............. 726/9 |
| 2014/0033285 A1* | 1/2014 | Gagliano ............. 726/6 |

OTHER PUBLICATIONS

Final Office Action for U.S. Appl. No. 13/486,907 (Apr. 16, 214) 20 pages.

* cited by examiner

DYNAMIC IDENTITY CONTEXT PROPAGATION

CROSS-REFERENCES TO RELATED APPLICATIONS

The present application claims the benefit and priority under 35 U.S.C. 119(e) of U.S. Provisional Application No. 61/541,442, filed Sep. 30, 2011, entitled "DYNAMIC IDENTITY CONTEXT PROPAGATION AND IDENTITY SWITCHING," the entire contents of which are incorporated herein by reference for all purposes.

The present application also incorporates by reference for all purposes the entire contents of the following commonly-assigned application, which is filed concurrently with the present application:

U.S. Non-Provisional application Ser. No. 13/486,907, entitled "DYNAMIC IDENTITY SWITCHING".

BACKGROUND

In an enterprise Web service and service-oriented architecture (SOA) environment, user identity (e.g., user name and/or ID) is typically propagated across layers of different interconnected applications. When such user identity information is propagated from a Web service client to a Web service, the information is usually protected via a security mechanism (e.g., WS-SecurityPolicy) and is accompanied by an authentication token such as a Security Assertion Markup Language (SAML) token. With the SAML mechanism, an individual originating a service request (i.e., the subject) is authenticated via a local authentication service that the Web service client trusts. Once the subject is authenticated, the Web service client transmits the service request, along with a user identity, to the Web service. The request further includes an assertion (in the form of a SAML token) that the user identity is authentic. Generally speaking, the user identity that is transmitted in the service request is the identity of the authenticated subject.

SUMMARY

In one aspect, in accordance with one or more embodiments, user identity information can be propagated, e.g., communicated, from one web service application to another by including the user identity information in service requests sent between the two applications. This user identity information is referred to as an "identity context" and includes the user identity itself as well as additional information related to the user identity, such as information about the user's computer system, software, and other aspects of the environment or user. Various service layers of web service frameworks and applications, such as the application that receives the request, can access the identity context for purposes such as authentication, access control, risk management, and other purposes. Information is stored in the identity context in the form of attributes. An attribute is, for example, a name and an associated data value, e.g., email=user@company.com. Identity-related attributes can include information about the user's client machine, information about the client's location, and the like. The attributes can be "identity claims" which are asserted by trusted application components. Each identity claim is described by a claims schema and stored in a claims dictionary. Web service applications and/or frameworks can create, receive, publish, and access the identity context. One common use case involves a web service client propagating an identity context to a web service server, e.g., via a communications network, and the identity context being published on the server side for use by the web service or other components.

According to one set of embodiments, techniques are provided for dynamically propagating identity context for a user among various components and layers of an SOA infrastructure. As described above, identity context is an information object that can contain various identity-related attributes, also referred to herein as identity claims. In a particular embodiment, identity context information can be received by a Web service client, packaged into a SAML (or other type of) authentication token, and transmitted, as part of a service request, to a Web service. The identity context information can include implicit claims and explicit claims. The implicit claims are created and stored in the identity context by upper layer components (e.g., OESSO/OAAM/OAM). The explicit claims are collected and added to the identity context by lower layer components, such as the OWSM component that performs web service security-related operations.

The explicit claims can be determined at runtime, e.g., based on a web services security policy on the client.

On the service side, the Web service can extract the identity context information from the token, filter the identity claims, and then publish the claims in a new identity context so that it can be made available to downstream applications/components. In this manner, applications in the infrastructure can have visibility into the identity context in order to, e.g., manage identity-related risks via their security policies.

Embodiments of the present invention provide methods, systems, and machine-readable media for dynamically propagating identity context information. In one embodiment, a method of propagating identity context information is provided, the method comprising receiving, by a first computer system, a request to invoke a web service; retrieving, by the first computer system, first security claims from application identity context information pertaining to a user; generating, by the first computer system, second security claims at runtime; packaging, by the first computer system, the first and second security claims into an authentication token; and transmitting, by the first computer system, the authentication token to a second computer system in a service request.

Embodiments may include one or more of the following features. The second computer system may be configured to extract the first and second security claims from the authentication token; validate the extracted first and second security claims; generate identity context information based upon the extracted first and second security claims; and publish and propagate the identity content information in an identity context object. To validate the extracted first and second security claims, the second computer system may be configured to verify that the first and second security claims conform to corresponding first and second claim schemas stored in a claims dictionary. The second security claims may be generated based upon a security policy associated with a web application executing on the first computer system. The second security claims may be based upon characteristics of a user, the characteristics determined at runtime based upon the security policy. The second security claims may comprise static claims defined prior to runtime and received from a claims dictionary or defined by a security policy. The packaging may comprise retrieving, by the first computer system, a user identity from the identity context information; and storing, by the first computer system, a subject in the authentication token, the subject based upon the user identity. Packaging may further comprise storing, by the first computer system, first and second attributes in the authentication token, the first attribute based upon at least one first claim from the first security claims, and the second attribute based upon at least one second claim from the second security claims.

Receiving second security claims at runtime may comprises receiving, by the first computer system, the second security claims from a Security Token Service. The first security claims are based upon characteristics of the user, characteristics of the user's environment, or a combination thereof. The characteristics of the user's environment comprise characteristics of the user's machine, including an indication of whether anti-virus software is enabled, a firewall is enabled, or a combination thereof. The method may further comprise receiving, by the second computer system, the service request, including the authentication token; extracting, by the second computer system, the first and second security claims from the authentication token; validating, by the second computer system, the extracted first and second security claims; generating, by the second computer system, identity context information based upon the extracted first and second security claims; and publishing, by the second computer system, the identity content information in an identity context object. Validating the identity context information may comprise verifying, by the computer system, that the first and second security claims conform to corresponding first and second claim schemas stored in a claims dictionary.

According to another embodiment, a non-transitory machine-readable medium for a computer system is provided, the non-transitory machine-readable medium having stored thereon a first series of instructions executable by a first processor of a first computer system to dynamically propagate identity context information, the first series of instructions comprising instructions that cause the first processor to receive a request to invoke a web service; instructions that cause the first processor to retrieve first security claims from application identity context information pertaining to a user; instructions that cause the first processor to generate second security claims at runtime; instructions that cause the first processor to package the first and second security claims into an authentication token; and instructions that cause the first processor to transmit the authentication token to a second computer system in a service request.

According to another embodiment of the invention a system is provided for dynamically propagating identity context information, the system comprising a first processor configured to: receive a request to invoke a web service; retrieve first security claims from application identity context information pertaining to a user; generate second security claims at runtime; package the first and second security claims into an authentication token; and transmit the authentication token to a second computer system in a service request.

A further understanding of the nature and advantages of the embodiments disclosed herein can be realized by reference to the remaining portions of the specification and the attached drawings.

DETAILED DESCRIPTION

In the following description, for the purposes of explanation, numerous details are set forth in order to provide an understanding of embodiments of the present invention. It will be apparent, however, to one of ordinary skill in the art that certain embodiments can be practiced without some of these details.

Figure 1:
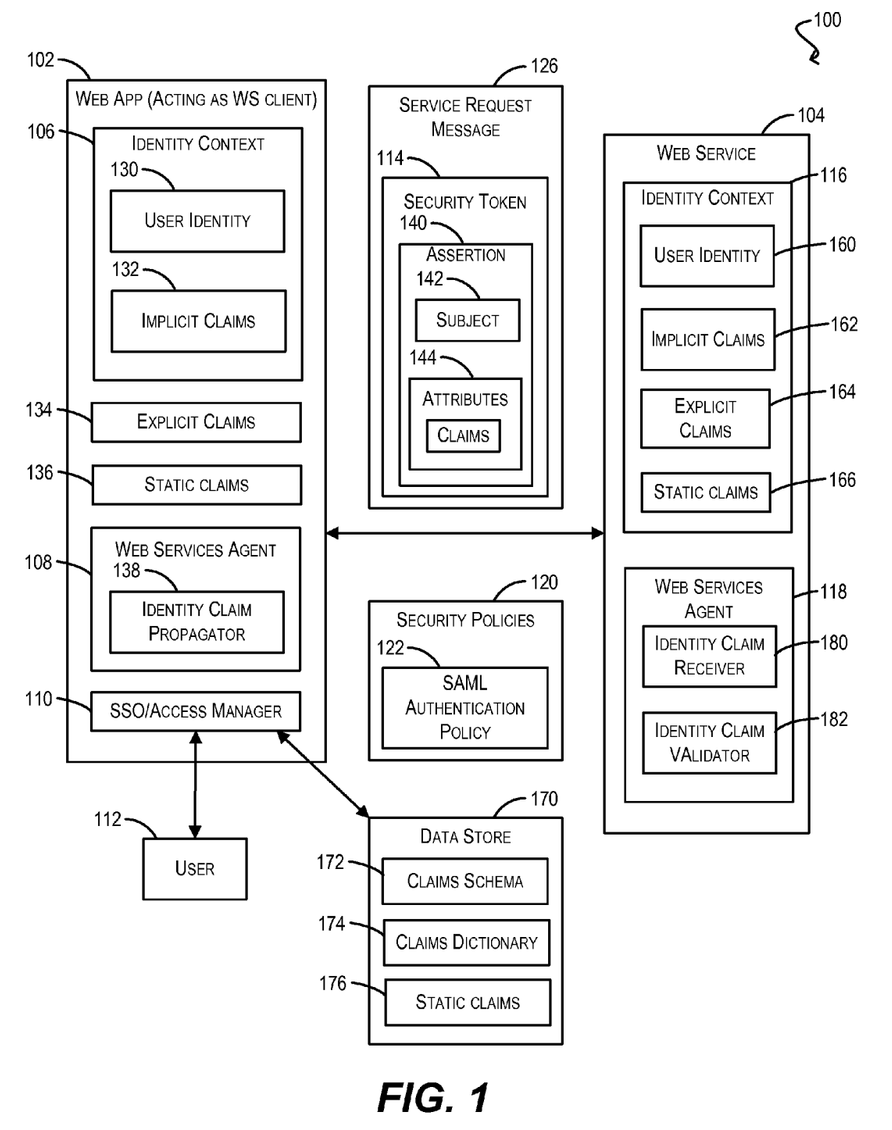
FIG. 1 is a simplified block diagram of a system for performing dynamic identity context propagation in accordance with embodiments.

FIG. 1 is a simplified block diagram of a system 100 for performing dynamic identity context propagation in accordance with embodiments. As shown, system 100 includes a web application 102 configured to act as a Web service client, and a Web service 104. Web service client 102 and Web service 104 can include respective Web services agents 108, 118 configured to provide a policy-based mechanism for securing and managing messages that are passed between the client 102 and the service 104, e.g., to implement Web service requests sent from the client 102 to the service 104 and responses sent from the service 104 to the client 102. Additional information regarding this mechanism can be found in U.S. patent application Ser. No. 13/118,947, filed May 31, 2011 and entitled "ATTACHING WEB SERVICE POLICIES TO A GROUP OF POLICY SUBJECTS," which is incorporated herein by reference in its entirety for all purposes.

In one set of embodiments, a user 112 can login and authenticate with web client 102 via a single sign-on service (SSO)/access manager 110. For example, user 112 can provide a username and password (or some other type of user credentials), and SSO/access manager 110 can verify the provided information against a credentials database.

Once user 112 is authenticated, SSO/access manager 110 (as well as other layers in the application stack) can collect information regarding user 112 and store that information in an identity context 106. As described above, identity context 106 is an information object that can contain various identity-related attributes, such as a user identity 130 and security claims 132, 134, 136. The security claims can relate to a number of different characteristics of the authenticated user 112 and/or the user's environment, such as characteristics of the user's machine (e.g., is anti-virus software enabled, is a firewall enabled), the user's location (e.g., IP address, geographic location, etc.), and the like.

Implicit security claims 132 are included in an identity context information object 106. Explicit security claims 134 are determined at runtime based on information in a claims dictionary 174, information in a security policy 122, or other information. Static claims 136 can be determined prior to runtime, e.g., at design time, or when an application 102 is being developed. The values of static claims do no ordinarily change at runtime. In a particular embodiment, each of the security claims 132, 134, 136 can be described by a claims schema 172 (which can belong to a unique claims namespace), and can be stored in a claims dictionary 174.

If user 112 initiates a transaction or task that requires web application 102 to invoke web service 104 using a service request 126, agent 108 can determine one or more security policies 120 that may apply for protecting the service request. In one set of embodiments, the one or more policies can include a SAML-based authentication policy 122. In other embodiments, the one or more policies can include different types of token-based authentication policies 124.

In one set of embodiments, the identity claims maintained by identity context object 106 are referred to as "implicit" identity claims. Thus, in one aspect, when the web services client agent 108 receives the identity context 106, the implicit claims 132 are the existing claims in the identity context 106, which are created and passed to the web services client agent from upper layer components (e.g. OESSO/OAAM/OAM, which are described below). Implicit claims 132 conform to associated claim schemas, which can be stored and retrieved from a claim dictionary 174 or other storage media. In one aspect, the claim schemas 172 are defined when an application is designed, configured, or deployed, but are not ordinarily defined at runtime. The values of the implicit claims 132 are ordinarily determined at runtime, but can also be determined prior to runtime, e.g., at design time.

Upon determining that a SAML-based policy 122 applies to the service request 126, e.g., because the service 104 is protected by the policy 122, an identity claim propagator 138 in the agent 108 can collect the implicit identity claims 132 from identity context object 106 and include the implicit identity claims 132 in a SAML assertion 140, which can be stored in a security token 114 for transmission to the service 104 as part of a service request 126. In particular, the identity claims related to user identity 130 in identity context 106 can be used to create the "Subject" in the SAML assertion 140, and the implicit claims 132 can be mapped to attributes in the SAML assertion 140.

In certain embodiments, agent 108 can also create or retrieve "explicit" identity claims 134 at runtime that are not initially included in the identity context object 106 when the object is received by the web services client agent 108, and can include those explicit identity claims (in addition to the implicit claims) into the SAML assertion for transmission to Web service 104. In one aspect, the explicit identity claims 134, including their names and/or data types, are not necessarily defined or known until runtime. The explicit claims 134 can be generated based upon information available at runtime, i.e., when the application is executing, such as information related to or based on the execution of the application, e.g., the amount of memory used by the application, the number of users of the application, and so on.

The explicit identity claims 134 can be retrieved from a variety of different sources at runtime. In one example, the explicit claims 134 can be defined by a web service manager security policy 122 attached to application 102. Requirements for explicit claims and propagation can be controlled by the security policy 122, and can be advertised using WS-SecurityPolicy. The values of explicit claims can be collected by the web services agents and/or through a Security Token Service (STS) or identity service, as described below with reference to FIG. 5.

For example, the following is a representation of a sample WS-SecurityPolicy SAML Token policy assertion with two explicit claims that are named role and email:

```
<sp:SamlToken
    sp:IncludeToken="http://docs.oasis-open.org/ws-sx/ws-
securitypolicy/200702/IncludeToken/AlwaysToRecipient">
    <wst:Claims Dialect="...">
        <ClaimType xmlns="http://.../owsm/identity"
            Optional="false" Uri="http://.../owsm/identity/role"/>
```

-continued

```
        <ClaimType xmlns=http://.../owsm/identity
            Optional="false" Uri=" http://.../owsm/identity/email"/>
    </wst:Claims>
    <wsp:Policy>
        <sp:WssSamlV11Token11/>
    </wsp:Policy>
</sp:SamlToken>
```

In certain embodiments, agent 108 can also retrieve "static" identity claims 136 from a source such as a data store 170, and can include the static identity claims 136 (in addition to the implicit and/or explicit claims) into the SAML assertion. In one aspect, the values of static claims are determined when the static claims are defined, e.g., at the time the static claims are stored in the data store, and the values of static claims do not change at runtime. The static claims can also be defined by a policy attached to application 102.

Once the SAML assertion 140 has been generated, the assertion 140 can be sent with the service request 126, in the form of a security token 114, from web client 102 to Web service 104. For example, the following is a representation of a sample SAML token 114 with attributes comprising a Subject 142 and five identity claims, which are named client: firewallenabled, client: antivirusenabled, session:authnlevel, risk:Level, and risk:newdevice:

```
<saml:Assertion ID="SAML-MUFwVb0e3adnNYa1LunKmw22"
IssueInstant="2011-05-26T17:26:35Z" Version="2.0">
    <saml:Issuer>www.oracle.com</saml:Issuer>
    <saml:Subject>
        <saml:NameID
Format=
"urn:oasis:names:tc:SAML:1.1:nameidformat:unspecified">weblogic
</saml:NameID>
        <saml:SubjectConfirmation Method=
"urn:oasis:names:tc:SAML:2.0:cm:sender-vouches "/>
    </saml:Subject>
<saml:Conditions NotBefore="2011-05-26T17:26:35Z"
NotOnOrAfter="2011-05-27T01:26:35Z"/>
<saml:AuthnStatement AuthnInstant="2011-05-26T17:26:35Z">
    <saml:AuthnContext>
<saml:AuthnContextClassRef>
urn:oasis:names:tc:SAML:2.0:ac:classes:Password
</saml:AuthnContextClassRef>
    </saml:AuthnContext>
</saml:AuthnStatement>
<saml:AttributeStatement>
    <saml:Attribute Name=" oracle:idm:claims:client: firewallenabled "
NameFormat=
"urn:oasis:names:tc:SAML:2.0:attrname-format:unspecified">
        <saml:AttributeValue xsi:type="xs:boolean">true
        </saml:AttributeValue>
    </saml:Attribute>
    <saml:Attribute Name=" oracle:idm:claims:client: antivirusenabled "
NameFormat=
"urn:oasis:names:tc:SAML:2.0:attrname-format:unspecified">
        <saml:AttributeValue xsi:type="xs:boolean">true
        </saml:AttributeValue>
    </saml:Attribute>
    <saml:Attribute Name=" oracle:idm:claims: session: authnlevel "
NameFormat=
"urn:oasis:names:tc:SAML:2.0:attrname-format:unspecified">
        <saml:AttributeValue xsi:type="xs:integer">5
        </saml:AttributeValue>
    </saml:Attribute>
    <saml:Attribute Name=" oracle:idm:claims: risk: Level"
NameFormat=
"urn:oasis:names:tc:SAML:2.0:attrname-format:unspecified">
        <saml:AttributeValue xsi:type="xs:integer">3
        </saml:AttributeValue>
```

-continued

```
    </saml:Attribute>
    <saml:Attribute Name=" oracle:idm:claims: risk: newdevice"
NameFormat=
"urn:oasis:names:tc:SAML:2.0:attrname-format:unspecified">
        <saml:AttributeValue xsi:type="xs:boolean">false
        </saml:AttributeValue>
    </saml:Attribute>
<saml:AttributeStatement>
<saml:Assertion>
```

At service 104, agent 118 receives the service request message 126 using an identity claim receiver 180. Agent 118 can invoke a login module to authenticate the user 112 to the service 104. Then agent 118 can create a service-side identity context 116 by extracting the attributes 144 from the received token 114 and determining values for the identity claims of the service-side identity context 116 based on the corresponding attributes 144 of the received token 114, e.g., using a mapping between SAML attributes and identity claims similar to that used on the client to generate the security token 114. The SAML-attribute representations of the claims are retrieved from the token 114. The claims can be validated differently according to their types (e.g., implicit, explicit, or static). The client-side identity context is re-created on the server side as the server-side identity context 116. In one example, the claims received in the security token 114 become implicit claims in the server-side identity context 116 for downstream applications and other components (e.g. OES) to consume. For the implicit identity claims, agent 118 can filter the claims against a claims dictionary 174. For the explicit and static identity claims, agent 118 can use an identity claim validator 182 to validate and filter the claims against a service-side policy. Claim validation is performed so that incorrect or invalid claims are identified and treated as errors. If validation fails, e.g., because one or more of the claims 162, 164, 166 does not conform to a claims dictionary, or to a policy or a schema associated with the claims, then the service agent 118 discards the claims for which validation is unsuccessful. In another embodiment, the service agent 118 discards all claims in the assertion 140 and/or security token 114 when validation fails for at least one of the claims in the assertion 140. Thus, the service agent 118 does not make invalid claims available for use. Filtering can be performed so that unexpected or unrecognized claims are ignored. Once the claims from the token 114 are validated and filtered, the agent 118 can publish the claims that pass validation and filtering via an identity context object 116. Thus, one or more of the implicit, explicit, and static claims can be included in the service-side identity context 116. With this identity context object 116, the identity claims can be made available to service 104 and to other downstream applications and components.

In one or more embodiments, the identity context can be accessed via an Identity Context application programming interface ("API"), which allows applications and security framework components to access and manage claims. The Identity Context API provides access to claims 132, 134, 136, as well as to claims schema 172, a claims dictionary 174, and static claims 176, all of which can be stored in a data store 170.

In one set of embodiments, each claim in an identity context 106 is identified by a canonical name that can have a namespace (i.e., a scope). Claim names are of the form <namespace>.<claim>, e.g., oracle.idm.claims.client.firewallenabled for a claim that represents a firewall enabled status. A claims schema 172 provides meta-data, i.e., a description of the claim's format or structure, that is associated with each claim. An Identity Context dictionary 174 defines a set of well-known claims. The dictionary can be a static dictionary, containing, for example, claims that are generated by Oracle's security solutions, and/or a dynamic dictionary that can be configured at runtime to define claims provided by external sources. In one embodiment, the Identity Context dictionary 174 defines four types of claims that represent session state and identity store state from the access manager, client state from the enterprise single sign-on system, and risk state from the adaptive access manager. Each claim state is identified by a claim namespace and has a canonical name of the form claim namespace+claim attribute, e.g. oracle:idm:claims:risk:Level.

In one embodiment, there are four predefined types of claims: Session State, Identity Store, Risk State, and Client state. The namespaces and the forms of attributes associated with these claim types are shown in Table 1 below.

TABLE 1

| Claim Type | Namespace | Attribute Form |
|---|---|---|
| Session State | oracle:idm:claims:session | appagent; appdomain; apppolicy; usercount; authnlevel; attributes:<attr> |
| Identity Store | oracle:idm:claims:ids | attributes:<attr> |
| Risk State | oracle:idm:claims:risk | newdevice; safeforuser |
| Client State | oracle:idm:claims:client | firewallenabled; antivirusenabled; clientip |

In one or more embodiments, the web service manager includes policies that have SAML assertions for identity propagation. These policies and the web service manager runtime are enhanced to support identity context propagation. For example, a configuration option "propagate identity context" is provided on the policies on both the client and server sides to control the propagation and publishing of identity context. By default, the configuration "propagate identity context" is set to false. If this option is set to true, the identity context will be propagated across web service invocations, e.g., as part of service request SOAP messages. In one or more embodiments, identity context is propagated by existing web services manager security policies as part of the SAML token. SAML 1.1 and SAML 2.2 policies with assertions that can be used for dynamic identity context propagation as described herein include the following policies: SAML sender-vouches assertions without message protection, WSS 10 SAML sender-vouches with message protection, WSS 11 SAML sender-vouches with message protection, SAML sender-vouches with transport level protection, WSS 10 SAML hook issued token with message protection, SAML bearer over SSL, ExactlyOne: SAML sender-vouches or username token without message protection, ExactlyOne: WSS 11 SAML or Username token with message protection, and ExactlyOne: SAML sender-vouches or Username token with transport level protection.

In one or more embodiments, a property named propagate.identity.context can be added to each policy to cause the identity context is to be propagated. If the value of the property is true on the client side and the Identity Context is available, then the SAML assertion is created from the claims in the Identity Context 106. Otherwise, the SAML assertion is created independently of the claims in the Identity Context 106. If this property is true on the server side, the server creates and publishes the Identity Context 116 from the SAML assertion 140 after the SAML assertion 140 is validated.

Figure 2:
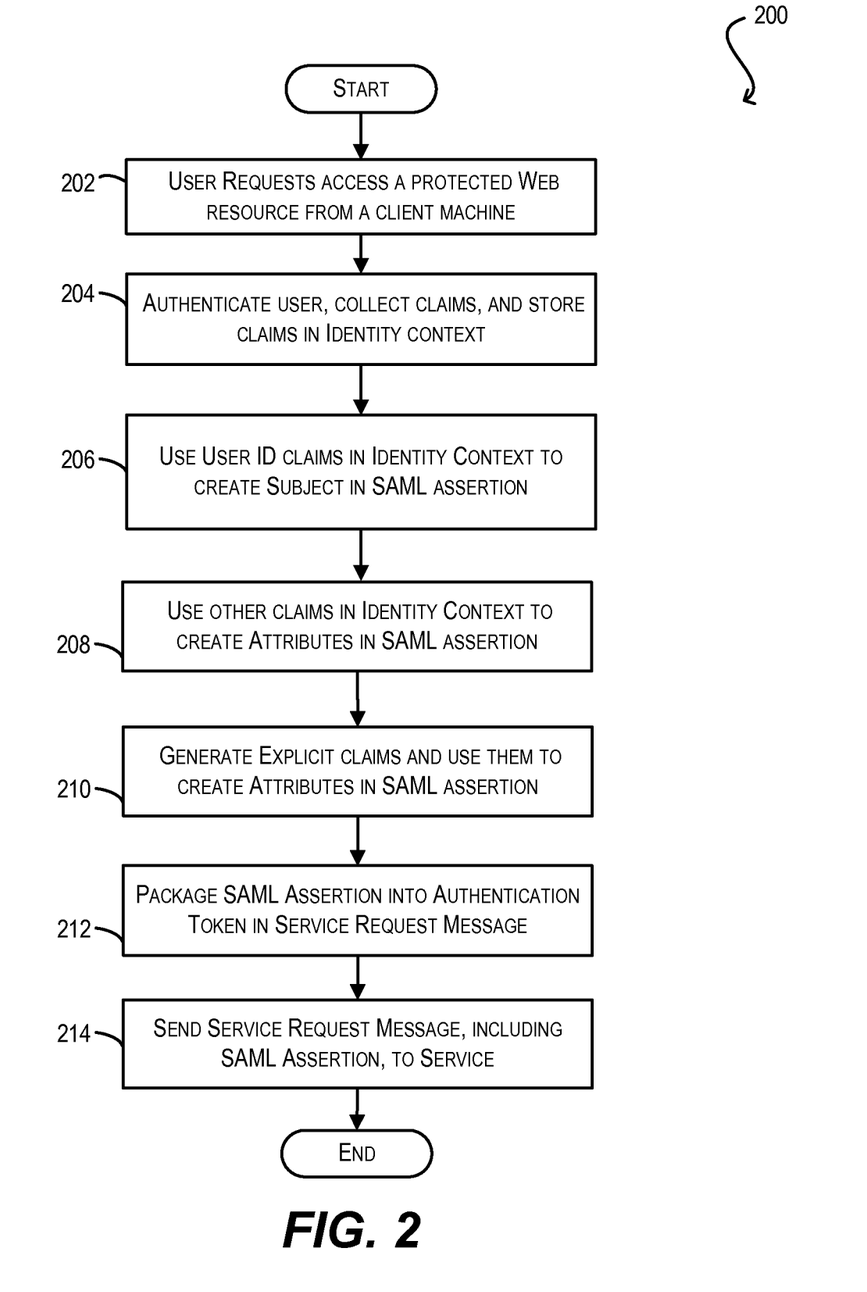
FIG. 2 is an illustrative flow diagram of a method of generating a service request that propagates an identity context in accordance with one or more embodiments.

FIG. 2 is an illustrative flow diagram of a method 200 of generating a service request that propagates an identity context in accordance with one or more embodiments. The process of FIG. 2 corresponds to the identity claim propagator 138 of the client-side web services agent 108 shown in FIG. 1. The processing depicted in FIG. 2 may be performed by software (executed by a processor), hardware, or combinations thereof. In one embodiment, the process of FIG. 2 is executed on a client computer system and invoked when a user of an application 102 requests access to a web service 104 that is protected by web service security, as illustrated by block 202, at which a user requests access to a protected web resource from a client machine. At block 204, the web service security framework authenticates the user 112, e.g., by requesting a user name and password or other credentials and verifying that the user name and password are correct. Block 204 also collects claims, such as implicit claims 132. The claims are, for example, names and values of attributes related to the user, client machine, or network, or other information about the system environment that is accessible to the client machine. The next portion of the method converts the claims to a SAML assertion 140 of a SAML token 114. Block 204 stores the collected claims in an identity context 106. The identity context can be, for example, a data structure or object stored in a memory of the client machine.

Block 206 then identifies one or more of the implicit claims 132 that represent the user ID, e.g., a claim with a name such as "User", retrieves the value of the user ID from that attribute, and stores the user ID value in a subject portion 142 of the SAML assertion 140. Block 208 retrieves other (non-user ID) implicit claims from the identity context 106, generates attributes based on the other implicit claims, and stores the attributes in the SAML assertion 140, e.g., by creating an attribute in the SAML assertion 140 for each of the other implicit claims. The name and value of each non-User ID claim of the implicit claims are used as the name and value of a corresponding attribute in the SAML assertion. Block 210 generates explicit claims, e.g., by retrieving the values of the explicit claims at runtime from the system environment, and stores the name and value of each explicit claim in an attribute of the SAML assertion. Although not shown in FIG. 2, static claims can be retrieved from memory or the claims dictionary 174 or other source of data, converted to attributes, and stored in the SAML assertion 140. The static claims may be, for example, claims with values determined at design time or deployment time.

Block 212 packages, e.g., stores, the SAML assertion into the authentication token 114, so that the SAML assertion 140 will be transmitted to the service 104 as part of the service message 126 in which the token 114 is stored. Block 212 can, for example, copy the value of the SAML assertion 140 into the token 114, or store a reference to the SAML assertion 140 in the token 114. Block 214 sends the service request message 126, including the SAML assertion 140 that has attributes based on the implicit, explicit, and/or static claims, to the service 140 via a communications network or other communication protocol. The process then ends, and the client 102 waits for a response from the service 104. The service 104 receives and processes the service request message 126 as described below with reference to FIG. 3.

Figure 3:
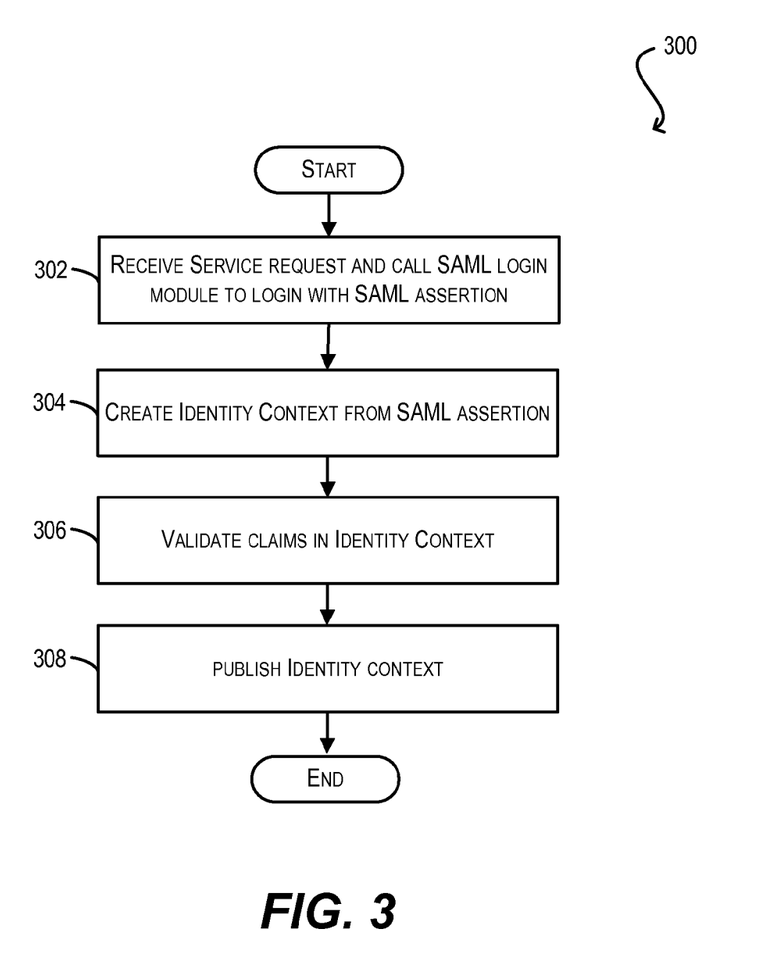
FIG. 3 is an illustrative flow diagram of a method 300 of receiving, validating, and publishing an identity context from a service request in accordance with one or more embodiments.

FIG. 3 is an illustrative flow diagram of a method 300 of receiving, validating, and publishing an identity context from a service request in accordance with one or more embodiments. The process of FIG. 3 corresponds to the identity claim receiver 180 and the identity claim validator 182 of the server-side web services agent 118 shown in FIG. 1. The processing depicted in FIG. 3 may be performed by software (executed by a processor), hardware, or combinations thereof. In one embodiment, the process of FIG. 3 is executed on a server computer system and invoked when a service request is received by a web service on the server computer. Block 302 receives a service request 126, such as that sent by the method of FIG. 2, retrieves the security token 114 and the SAML assertion 140 from the request message 126, and invokes a SAML login module to log the user in, e.g., authenticate the user, using the SAML assertion 140 received in the service request. Block 304 converts the SAML assertion 140 to a service-side identity context 116. Block 304 can copy the subject 142 of the assertion into a user-ID claim 160 of the identity context 116, and copies the names and values of the attributes 144 to implicit claims 162 in the service-side identity context 116. In another embodiment, block 304 copies references to those attributes 144 of the assertion 140 to the identity context 116. Block 306 validates the claims in the identity context 116. The validation performed in block 306 can occur as part of the creation of the identity context 116, e.g., claims can be validated as they are added to the identity context, and/or validation can occur after the identity context 116 has been created. For example, block 306 can retrieve the claim schemas 172 for the implicit claims 162, explicit claims 164, and/or static claims 166, and verify that those claims conform to structure, data type, value, and/or format requirements specified in their corresponding claim schemas 172. Block 308 publishes the identity context 116, including the identity claims 162, 164, and/or 166, to make the claims in the identity context 116 accessible to other components of the web service environment, and the process ends.

Figure 4:
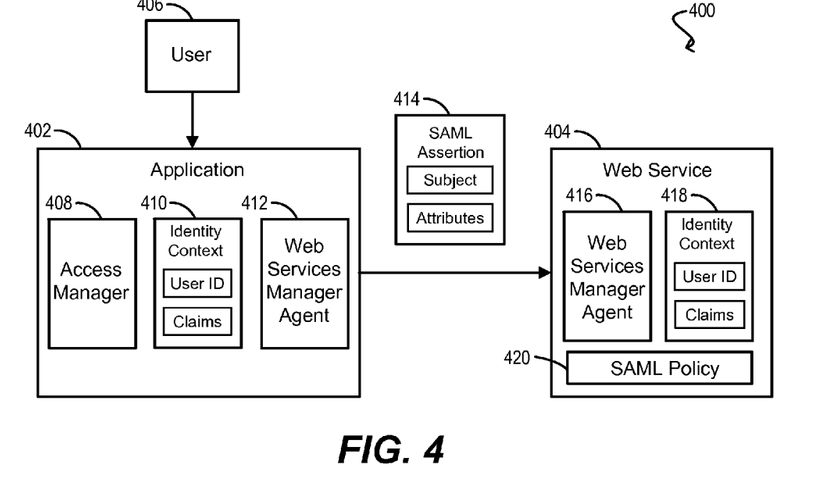
FIG. 4 is an illustrative drawing of identity context propagation from a web service client to a web service in accordance with embodiments.

FIG. 4 is an illustrative drawing of identity context propagation from a web service client to a web service in accordance with embodiments. In the example scenario shown in FIG. 4, a user 406 accesses a protected Web resource, e.g., the application 402, from a client machine (not shown) on which Oracle® Enterprise Single Sign-On ("OESSO") is installed. OESSO is responsible for collecting claims of client state to determine information such as the firewall and anti-virus state, e.g., the type of firewall and anti-virus software in use. The Web resource 402 is protected by one or more access managers 408, such as Oracle Access Manager ("OAM"), which provides authentication, and Oracle Adaptive Access Manager ("OAAM"), which provides additional types of authentication and detection of security risks. Once the user has been authenticated by the OAM 408, the OAM collects claims from OESSO, and also collects claims from OAAM related to risk state, e.g., "known device" and "risk score" claims. OAM 408 can also collect claims for session state from itself. OAM 408 establishes an Identity Context 410 with these claims, and propagates the Identity Context 410 through the Web application layer. OAM 408 then publishes the Identity Context 410 using the Oracle Platform Security Services ("OPSS"), stores the claims of the Identity Context 410 as security attributes of the SAML assertion 414 (e.g., using the AttributeService interface), and stores the security attributes in the application security context (using the AppSecurityContext interface).

The Web service 404 to be invoked by the client application 402 is protected by a server-side web services manager agent 416 and secured with a SAML-based policy 420. To satisfy the web service 404 security requirements, a client web services manager agent 412 acquires the Identity Context 410 published by the OAM 408, creates a SAML assertion 414, and packages the claims from the Identity Context 410 into the SAML assertion 414. If the propagate.identity.context property is true, the client agent 412 calls the OPSS AppSecurityContext and AttributeService interfaces to retrieve the identity context 410, and then retrieves the claims from the identity context 410. The "user id" and "user id format" claims from the Identity Context 410 are used to create the Subject in the SAML assertion 414, while each of the other claims in the Identity Context 410 is mapped to an Attribute that is stored in the SAML assertion 414. In one embodiment, claims identified as CLAIM_NS_NAMEID, CLAIM_NAMEID_VALUE, CLAIM_NAMEID_FORMAT and CLAIM_NAMEID_QUALIFIER in the Claims Dictionary are included in the Identity Context and are used for the NameID in the Subject in the SAML assertion 414. Each of the other claims becomes an Attribute in an Attribute Statement in the SAML assertion 414.

The client agent 412 then stores the SAML assertion 414 in a service request 422 to be sent to the service 404. The service request 422 is, for example, a SOAP request message. The service request 422, which includes the SAML assertion, is then sent to the web service 404 via SOAP or another communication protocol. On the service side 404, the web services manager server agent 416 retrieves the SAML assertion 414 from the service request 422 and un-packages the SAML assertion by retrieving the SAML subject and attributes, and creating a service-side Identity Context 418 based on the data extracted from the SAML assertion 414. The server agent 416 calls the OPSS SAML login module to login with the SAML assertion 414. The server agent 416 or the login module validates the SAML assertion as part of creating the Identity Context 418. If the propagate.identity.context property is true, and the identity context is created using the identity context API. The server agent then publishes the Identity Context 418, thereby making the Identity Context 418 available to applications and other components, such as an entitlements server for authorization. To publish the Identity context 418, the server agent creates a key (e.g., a GUID) for the identity context 418, publishes the identity context 418 to the OPSS AttributeService, and calls the OPSS SubjectSecurity API to store the identity context key into the OPSS AppSecurityContext.

Figure 5:
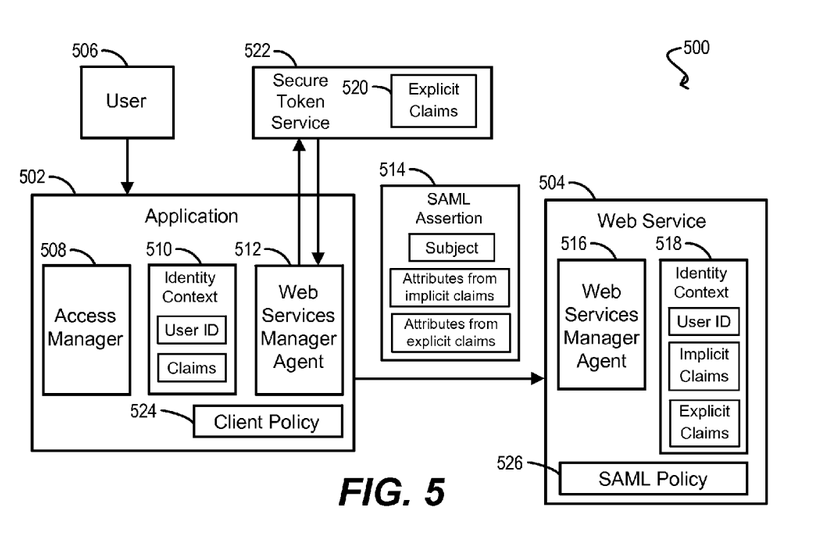
FIG. 5 is an illustrative drawing of propagation of implicit and explicit claims in an entity context in accordance with embodiments.

FIG. 5 is an illustrative drawing of propagation of implicit and explicit claims in an entity context in accordance with embodiments. In the scenario of FIG. 5, a web services client 502 is secured with a client security policy 524 which, in one embodiment, requires an issued SAML assertion 514 from a Security Token Service 522. The Web services client 502 is protected by one or more access managers 508. The Security Token Service 522 is trusted by both the client 502 and the service 504 and is useful when, for example, the client 502 and service 504 are in different security domains and thus do not directly trust each other. The Security Token Service 522 issues security tokens that represent a trusted identity of an entity such as the user 506 The client policy 524 also has a requirement for one or more explicit claims, which can be provided by the Security Token Service 522 to gain access to the client application 502. When the user 506 requests that the web service application 502 perform an operation, the client agent 512 sends a request for a security token (e.g., an RST request) to a Security Token Service 522. The request contains the implicit claims from the identity context 510 and the requirement for explicit claims. The Security Token Service 522 obtains the values for the explicit claims 520 and creates a SAML assertion that includes the implicit claims and the explicit claims 520. The Security Token Service 522 then responds to the client 502, and the response includes the SAML assertion with the implicit claims and the explicit claims 520. The client 502 sends the request to the service 504 with the SAML assertion 514. On the service side, web services manager server agent 516 calls the OPSS SAML login module, extracts the attributes from the SAML assertion 514, creates the Identity Context 518, and has the Identity Context 518 published with the OPSS API, thereby making the Identity Context available for use by the application and the other components (e.g. OES for authorization).

It should be appreciated that the description above is illustrative and not intended to limit embodiments of the present invention. For example, dynamic identity context propagation can apply to a number of different types of authentication mechanisms other than SAML. One of ordinary skill in the art will recognize many variations, modifications, and alternatives.

Figure 6:
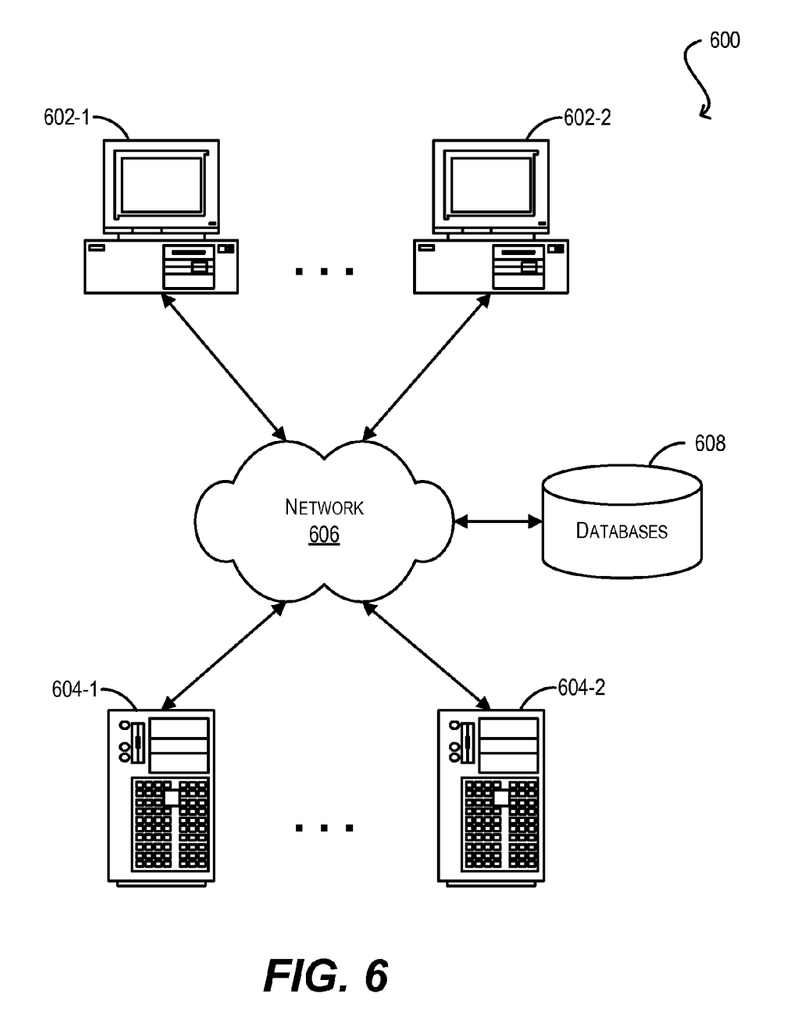
FIG. 6 is a simplified block diagram of a system environment in accordance with an embodiment.

FIG. 6 is a simplified block diagram illustrating a system environment 600 that can be used in accordance with an embodiment. As shown, system environment 600 can include one or more client computing devices 602-1, 602-2, which can be configured to operate a client application such as a web browser, a UNIX/Solaris terminal application, and/or the like. In various embodiments, client computing devices 602-1, 602-2 can be used by, e.g., user 112 of FIG. 1 to access web application 102.

Client computing devices 602-1, 602-2 can be general purpose personal computers (e.g., personal computers and/or laptop computers running various versions of Microsoft Windows and/or Apple Macintosh operating systems), cell phones or PDAs (running software such as Microsoft Windows Mobile and being Internet, e-mail, SMS, Blackberry, or other communication protocol enabled), and/or workstation computers running any of a variety of commercially-available UNIX or UNIX-like operating systems (including without limitation the variety of GNU/Linux operating systems). Alternatively, client computing devices 602-1, 602-2 can be any other electronic device capable of communicating over a network, such as network 606 described below. Although system environment 600 is shown with two client computing devices, it should be appreciated that any number of client computing devices can be supported.

System environment 600 can further include a network 606. Network 606 can be any type of network familiar to those skilled in the art that can support data communications using a network protocol, such as TCP/IP, SNA, IPX, AppleTalk, and the like. Merely by way of example, network 606 can be a local area network (LAN), such as an Ethernet network, a Token-Ring network and/or the like; a wide-area network; a virtual network, including without limitation a virtual private network (VPN); the Internet; an intranet; an extranet; a public switched telephone network (PSTN); an infra-red network; a wireless network (e.g., a network operating under any of the IEEE 802.11 suite of protocols, the Bluetooth protocol known in the art, and/or any other wireless protocol); and/or any combination of these and/or other networks.

System environment 600 can further include one or more server computers 604-1, 604-2 which can be general purpose computers, specialized server computers (including, e.g., PC servers, UNIX servers, mid-range servers, mainframe computers, rack-mounted servers, etc.), server farms, server clusters, or any other appropriate arrangement and/or combination. Servers 604-1, 604-2 can run an operating system including any of those discussed above, as well as any commercially available server operating system. Servers 604-1, 604-2 can also run any of a variety of server applications and/or mid-tier applications, including web servers, FTP servers, CGI servers, Java virtual machines, and the like. In one set of embodiments, servers 604-1, 604-2 can each run an application server that is configured to provide an execution environment for web application 102, web service 104, web service client 202, and/or web service 204 of FIGS. 1 and 2.

System environment 600 can further include one or more databases 608. In one set of embodiments, databases 608 can include databases that are managed by one or more of servers 604-1, 604-2. Databases 608 can reside in a variety of locations. By way of example, databases 608 can reside on a storage medium local to (and/or resident in) one or more of computers 602-1, 602-2, 604-1, 604-2. Alternatively, databases 608 can be remote from any or all of computers 602-1, 602-2, 604-1, 604-2, and/or in communication (e.g., via network 606) with one or more of these. In one set of embodiments, databases 608 can reside in a storage-area network (SAN) familiar to those skilled in the art.

Figure 7:
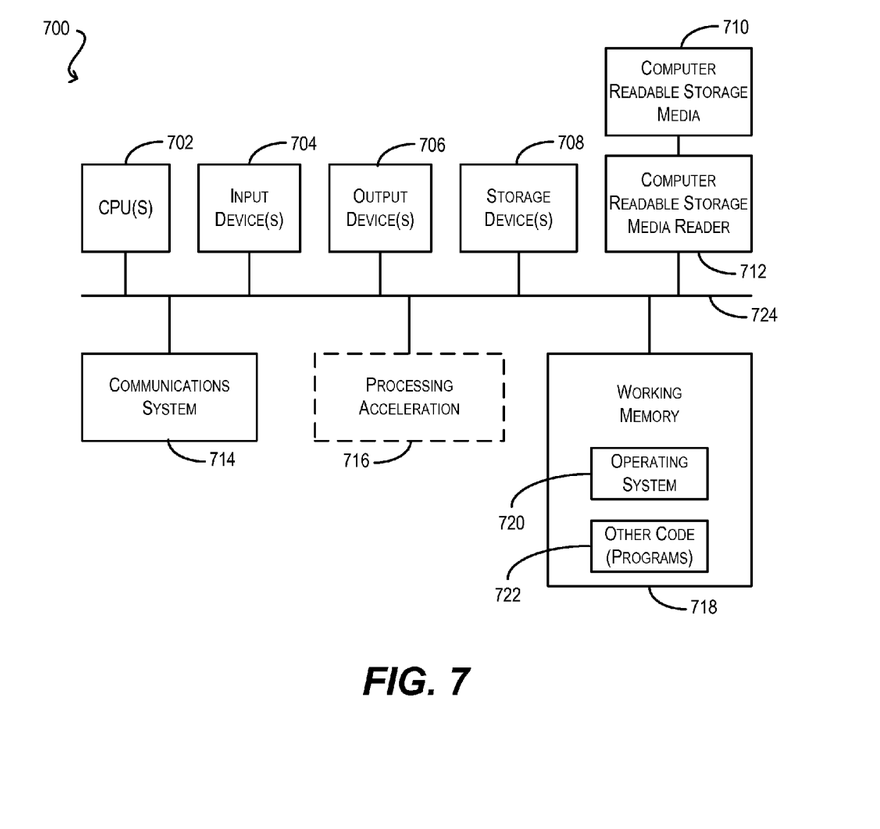
FIG. 7 is a simplified block diagram of a computer system in accordance with an embodiment.

FIG. 7 is a simplified block diagram illustrating a computer system 700 that can be used in accordance with an embodiment. In various embodiments, computer system 700 can be used to implement any of computers 602-1, 602-2, 604-1, 604-2 described with respect to system environment 600 above. As shown, computer system 700 can include hardware elements that are electrically coupled via a bus 724. The hardware elements can include one or more central processing units (CPUs) 702, one or more input devices 704 (e.g., a mouse, a keyboard, etc.), and one or more output devices 706 (e.g., a display device, a printer, etc.). Computer system 700 can also include one or more storage devices 708. By way of example, the storage device(s) 708 can include devices such as disk drives, optical storage devices, and solid-state storage devices such as a random access memory (RAM) and/or a read-only memory (ROM), which can be programmable, flash-updateable and/or the like.

Computer system 700 can additionally include a computer-readable storage media reader 712, a communications subsystem 714 (e.g., a modem, a network card (wireless or wired), an infra-red communication device, etc.), and working memory 718, which can include RAM and ROM devices as described above. In some embodiments, computer system 700 can also include a processing acceleration unit 716, which can include a digital signal processor (DSP), a special-purpose processor, and/or the like.

Computer-readable storage media reader 712 can be connected to a computer-readable storage medium 710, together (and, optionally, in combination with storage device(s) 708) comprehensively representing remote, local, fixed, and/or removable storage devices plus storage media for temporarily and/or more permanently containing computer-readable information. Communications system 714 can permit data to be exchanged with network 606 and/or any other computer described above with respect to system environment 600.

Computer system 700 can also comprise software elements, shown as being currently located within working memory 718, including an operating system 720 and/or other code 722, such as an application program (which may be a client application, Web browser, middle tier/server application, etc.). It should be appreciated that alternative embodiments of computer system 700 can have numerous variations from that described above. For example, customized hardware can be used and particular elements can be implemented in hardware, software, or both. Further, connection to other computing devices such as network input/output devices can be employed.

Computer readable storage media for containing code, or portions of code, executable by computer system 700 can include any appropriate media known or used in the art, such as but not limited to volatile/non-volatile and removable/non-removable media. Examples of computer-readable storage media include RAM, ROM, EEPROM, flash memory, CD-ROM, digital versatile disk (DVD) or other optical storage, magnetic cassettes, magnetic tape, magnetic disk storage or other magnetic storage devices, an any other medium that can be used to store data and/or program code and that can be accessed by a computer.

Although specific embodiments of the invention have been described above, various modifications, alterations, alternative constructions, and equivalents are within the scope of the invention. For example, although embodiments of the present invention have been described with respect to certain process flows and steps, it should be apparent to those skilled in the art that the scope of the present invention is not limited to the described flows/steps.

Yet further, although embodiments of the present invention have been described using a particular combination of hardware and software, it should be recognized that other combinations of hardware and software are also within the scope of the present invention.

The specification and drawings are, accordingly, to be regarded in an illustrative rather than restrictive sense. It will be evident that additions, subtractions, and other modifications may be made thereunto without departing from the broader spirit and scope of the invention.

What is claimed is:

1. A method for propagating identity context information, the method comprising:
    receiving, at a computer, a service request initiated by a user requesting a web application to invoke one or more web services, the service request requesting conversion of an authentication token included in the service request into service-side identity context information pertaining to the user;
    extracting, by the computer, first and second sets of security claims from the authentication token,
    the first set of security claims having been retrieved from identity context information pertaining to the user generated in response to the user being authenticating to the web application, the identity context information having a set of one or more identity-related attributes and a set of one or more security claims related to characteristics of the user, the user's environment, or combinations thereof, and
    the second set of security claims having been created based on runtime information different from the identity context information;
    validating, by the computer, the extracted first and second sets of security claims;
    generating, by the computer system, the service-side identity context information pertaining to the user based upon the extracted first and second sets of security claims; and
    propagating, by the computer, the service-side identity context information pertaining to the user in an identity context object to at least one of the one or more web services.

2. The method of claim 1 further comprising publishing the service-side identity content information pertaining to the user as the identity context object available to the one or more web services.

3. The method of claim 1 wherein validating, by the computer, the extracted first and second sets of security claims comprises verifying that the first and second security sets of claims conform to corresponding first and second sets of claim schemas stored in a claims dictionary.

4. The method of claim 1 wherein extracting, by the computer, the first and second sets of security claims from the authentication token comprises extracting at least one security claim from the second set of security claims generated based upon a security policy associated with the web application.

5. The method of claim 4 wherein the at least one security claim is generated based upon characteristics of the user, the characteristics determined at runtime based upon the security policy.

6. The method of claim 1 wherein extracting, by the computer, the first and second sets of security claims from the authentication token comprises extracting at least one static security claims from the second set of claims defined prior to runtime and received from a claims dictionary or defined by a security policy.

7. The method of claim 1 wherein extracting, by the computer, the first and second sets of security claims from the authentication token comprises extracting at least one security claims provided by a Security Token Service from the second set of security claims.

8. The method of claim 1 wherein extracting, by the computer, the first and second sets of security claims from the authentication token comprises extracting at least one security claim in the first set of security claims generated based on one or more characteristics of the user's machine, including an indication of whether anti-virus software is enabled, a firewall is enabled, or a combination thereof.

9. The method of claim 1 wherein receiving, at the computer, the service request instructing the web service to convert the included authentication token into the service-side identity context information pertaining to the user comprises receiving a subject in the authentication token generated based on a user identity retrieved from identity context information associated with the web application.

10. A non-transitory computer-readable medium storing a computer program product for propagating identity context information which when executed by a processor of a computer causes the processor to:
    receive a service request initiated by a user requesting a web application to invoke one or more web services, the service request requesting conversion of an authentication token included in the service request into service-side identity context information pertaining to the user;
    extract first and second sets of security claims from the authentication token,
    the first set of security claims having been retrieved from identity context information pertaining to the user generated in response to the user being authenticating to the web application, the identity context information having a set of one or more identity-related attributes and a set of one or more security claims related to characteristics of the user, the user's environment, or combinations thereof, and
    the second set of security claims having been created based on based on runtime information different from the identity context information;
    validate the extracted first and second sets of security claims;
    generate the service-side identity context information pertaining to the user based upon the extracted first and second sets of security claims; and
    propagate the service-side identity context information pertaining to the user in an identity context object to at least one of the one or more web services.

11. The non-transitory computer-readable medium of claim 10 wherein the computer program product further causes the processor to publish the service-side identity content information pertaining to the user as the identity context object available to the one or more web services.

12. The non-transitory computer-readable medium of claim 11 wherein to validate the extracted first and second sets of security claims the computer program product causes the processor to verify that the first and second security sets of claims conform to corresponding first and second sets of claim schemas stored in a claims dictionary.

13. The non-transitory computer-readable medium of claim 10 wherein to extract the first and second sets of security claims from the authentication token the computer program product causes the processor to extract at least one security claim from the second set of security claims generated based upon a security policy associated with the web application.

14. The non-transitory computer-readable medium of claim 13 wherein the at least one security claim is generated based upon characteristics of the user, the characteristics determined at runtime based upon the security policy.

15. The non-transitory computer-readable medium of claim 10 wherein to extract the first and second sets of security claims from the authentication token the computer program product causes the processor to extract at least one static security claims from the second set of claims defined prior to runtime and received from a claims dictionary or defined by a security policy.

16. The non-transitory computer-readable medium of claim 10 wherein to extract the first and second sets of security claims from the authentication token the computer program product causes the processor to extract at least one security claims provided by a Security Token Service from the second set of security claims.

17. The non-transitory computer-readable medium of claim 10 wherein to extract the first and second sets of security claims from the authentication token the computer program product causes the processor to extract at least one security claim in the first set of security claims generated based on one or more characteristics of the user's machine, including an indication of whether anti-virus software is enabled, a firewall is enabled, or a combination thereof.

18. The non-transitory computer-readable medium of claim 10 wherein to receive the service request instructing the web service to convert the included authentication token into the service-side identity context information pertaining to the user the computer program product causes the processor to receive a subject in the authentication token generated based on a user identity retrieved from identity context information associated with the web application.

19. A system for propagating identity context information, the system comprising:
    a hardware processor; and
    a memory storing a set of instructions which when executed by the processor cause the processor to:
        receive a service request initiated by a user requesting a web application to invoke one or more web services, the service request requesting conversion of an authentication token included in the service request into service-side identity context information pertaining to the user;
        extract first and second sets of security claims from the authentication token,
        the first set of security claims having been retrieved from identity context information pertaining to the user generated in response to the user being authenticating to the web application, the identity context information having a set of one or more identity-related attributes and a set of one or more security claims related to characteristics of the user, the user's environment, or combinations thereof, and the second set of security claims having been created based on based on runtime information different from the identity context information;

validate the extracted first and second sets of security claims;

generate the service-side identity context information pertaining to the user based upon the extracted first and second sets of security claims; and propagate the service-side identity context information pertaining to the user in an identity context object to one or more web services.

20. The system of claim 19 wherein the set of instructions further cause the processor to publish the service-side identity content information pertaining to the user as the identity context object available to the one or more web services.

21. The system of claim 20 wherein to validate the extracted first and second sets of security claims the set of instructions cause the processor to verify that the first and second security sets of claims conform to corresponding first and second sets of claim schemas stored in a claims dictionary.

22. The system of claim 19 wherein to extract the first and second sets of security claims from the authentication token the set of instructions cause the processor to extract at least one security claim from the second set of security claims generated based upon a security policy associated with the web application.

23. The system of claim 22 wherein the at least one security claim is generated based upon characteristics of the user, the characteristics determined at runtime based upon the security policy.

24. The system of claim 19 wherein to extract the first and second sets of security claims from the authentication token the set of instructions cause the processor to extract at least one static security claims from the second set of claims defined prior to runtime and received from a claims dictionary or defined by a security policy.

25. The system of claim 19 wherein to extract the first and second sets of security claims from the authentication token the set of instructions cause the processor to extract at least one security claims provided by a Security Token Service from the second set of security claims.

26. The system of claim 19 wherein to extract the first and second sets of security claims from the authentication token the set of instructions cause the processor to extract at least one security claim in the first set of security claims generated based on one or more characteristics of the user's machine, including an indication of whether anti-virus software is enabled, a firewall is enabled, or a combination thereof.

27. The system of claim 19 wherein to receive the service request instructing the web service to convert the included authentication token into the service-side identity context information pertaining to the user the set of instructions cause the processor to receive a subject in the authentication token generated based on a user identity retrieved from identity context information associated with the web application.

* * * * *

UNITED STATES PATENT AND TRADEMARK OFFICE
CERTIFICATE OF CORRECTION

PATENT NO. : 8,966,572 B2
APPLICATION NO. : 13/486848
DATED : February 24, 2015
INVENTOR(S) : Kavantzas et al.

Page 1 of 1

It is certified that error appears in the above-identified patent and that said Letters Patent is hereby corrected as shown below:

In the claims

In column 15, lines 52-53, in Claim 10, delete "based on based on" and insert -- based on --, therefor.

In column 17, line 2, in Claim 19, delete "based on based on" and insert -- based on --, therefor.

Signed and Sealed this
Thirteenth Day of October, 2015

Michelle K. Lee
*Director of the United States Patent and Trademark Office*